US011397511B1

(12) United States Patent
Zimmer

(10) Patent No.: US 11,397,511 B1
(45) Date of Patent: Jul. 26, 2022

(54) SYSTEM AND METHOD FOR IMPLEMENTING IMPROVED USER INTERFACE

(71) Applicant: Nationwide Mutual Insurance Company, Columbus, OH (US)

(72) Inventor: Andrew Zimmer, Columbus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 0 days.

(21) Appl. No.: 15/786,734

(22) Filed: Oct. 18, 2017

(51) Int. Cl.
*G06F 3/0482* (2013.01)
*G06T 19/00* (2011.01)
*G06F 3/04817* (2022.01)
*G06Q 40/08* (2012.01)

(52) U.S. Cl.
CPC ........ *G06F 3/0482* (2013.01); *G06F 3/04817* (2013.01); *G06Q 40/08* (2013.01); *G06T 19/006* (2013.01); *G06T 2200/24* (2013.01)

(58) Field of Classification Search
CPC ... G06F 3/0482; G06F 3/04817; G06Q 40/08; G06T 19/006; G06T 2200/04
See application file for complete search history.

(56) References Cited

U.S. PATENT DOCUMENTS

| 6,611,268 | B1 * | 8/2003 | Szeliski | G06T 7/194 345/473 |
| 2004/0071453 | A1 * | 4/2004 | Valderas | G11B 27/105 386/333 |
| 2004/0217947 | A1 * | 11/2004 | Fitzmaurice | G06F 3/0481 345/183 |
| 2005/0086587 | A1 * | 4/2005 | Balz | G06F 40/174 715/221 |
| 2006/0089843 | A1 * | 4/2006 | Flather | G06Q 30/06 705/1.1 |
| 2007/0250901 | A1 * | 10/2007 | McIntire | H04N 21/8586 725/146 |
| 2010/0004957 | A1 * | 1/2010 | Ball | G06Q 40/00 705/4 |
| 2010/0018382 | A1 * | 1/2010 | Feeney | A63H 5/00 84/615 |
| 2010/0057566 | A1 * | 3/2010 | Itzhak | G06Q 30/0255 705/14.53 |
| 2010/0169389 | A1 * | 7/2010 | Weber | G11B 27/038 707/804 |

(Continued)

*Primary Examiner* — Tadesse Hailu
(74) *Attorney, Agent, or Firm* — Morgan, Lewis & Bockius LLP

(57) ABSTRACT

A graphical user interface comprising at least two layers is displayed. One layer comprises a still and video image layer. The still and video image layer comprises a plurality of still images and a plurality of video content items. One layer comprises an interactive icon layer. The interactive icon layer comprises a plurality of icons. Upon receiving a first navigation request, one the plurality of still images currently being rendered is replaced with another of the plurality of still images. Upon receiving an activation of one of the interactive icons, text and/or graphics or one of a plurality of electronic forms for capturing data input is displayed. Upon the occurrence of a triggering event, the still image ceases to be displayed and, instead, one of the plurality of video content items is displayed. The displayed video content item is randomly selected from the plurality of video content items.

18 Claims, 13 Drawing Sheets

Diagram

(56) References Cited

U.S. PATENT DOCUMENTS

| | | | | |
|---|---|---|---|---|
| 2010/0251092 | A1* | 9/2010 | Sun | G06F 17/243 |
| | | | | 715/222 |
| 2011/0164823 | A1* | 7/2011 | Park | G06T 7/12 |
| | | | | 382/199 |
| 2012/0174038 | A1* | 7/2012 | Tamayo | G06F 3/0482 |
| | | | | 715/849 |
| 2012/0262484 | A1* | 10/2012 | Gottfeld | G09B 5/065 |
| | | | | 345/632 |
| 2012/0330791 | A1* | 12/2012 | Stevenson | G06N 3/006 |
| | | | | 705/26.61 |
| 2013/0198634 | A1* | 8/2013 | Matas | G06T 11/60 |
| | | | | 715/717 |
| 2014/0188758 | A1* | 7/2014 | Harper | G06Q 40/06 |
| | | | | 705/36 R |
| 2014/0228118 | A1* | 8/2014 | Hardy | G06T 19/006 |
| | | | | 463/31 |
| 2015/0169581 | A1* | 6/2015 | Pusateri | G06F 16/4387 |
| | | | | 707/737 |
| 2015/0339006 | A1* | 11/2015 | Chaland | G06F 3/0482 |
| | | | | 715/835 |
| 2015/0382047 | A1* | 12/2015 | Van Os | G10L 17/005 |
| | | | | 725/38 |
| 2016/0065641 | A1* | 3/2016 | Chesluk | H04L 67/02 |
| | | | | 709/219 |
| 2016/0211004 | A1* | 7/2016 | Akatiff | G11B 27/031 |
| 2016/0283049 | A1* | 9/2016 | Faydi | G06F 3/0482 |
| 2017/0171577 | A1* | 6/2017 | Kipp | H04N 21/26258 |
| 2017/0244770 | A1* | 8/2017 | Eckerdal | G06F 16/4387 |
| 2018/0210741 | A1* | 7/2018 | Xu | G06F 40/14 |
| 2018/0246871 | A1* | 8/2018 | McNabb | G06F 40/186 |
| 2018/0322685 | A1* | 11/2018 | Yi | G06T 15/04 |
| 2019/0364211 | A1* | 11/2019 | Chun | H04N 21/8456 |

\* cited by examiner

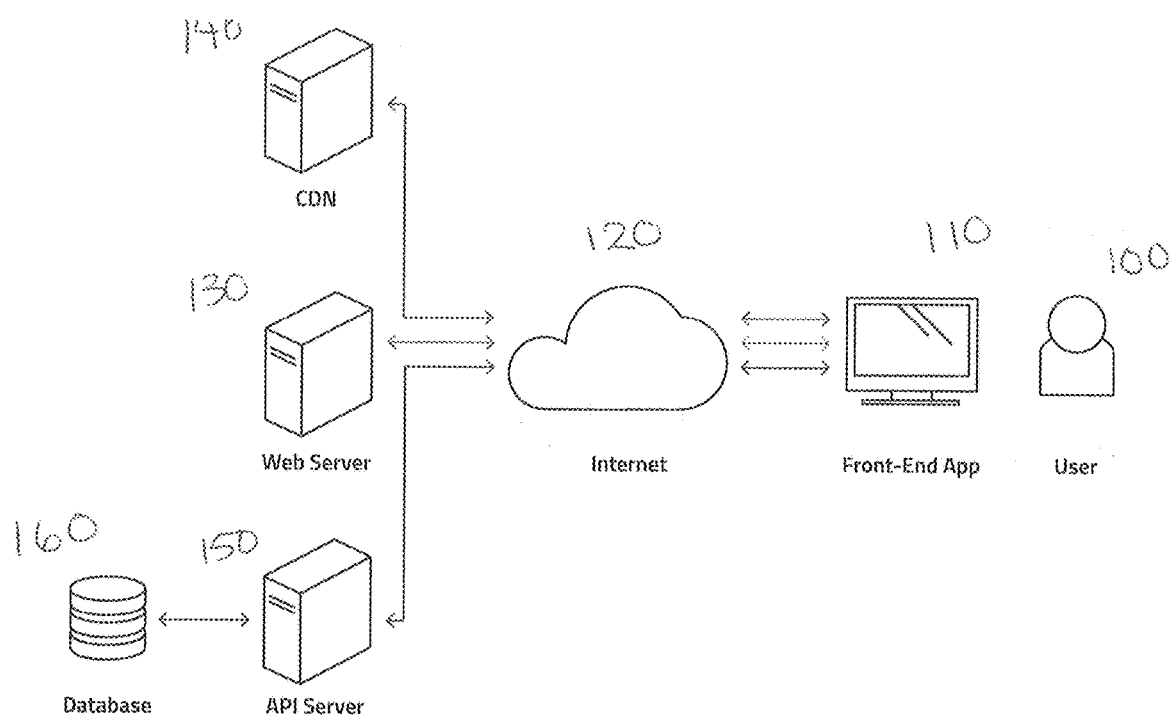

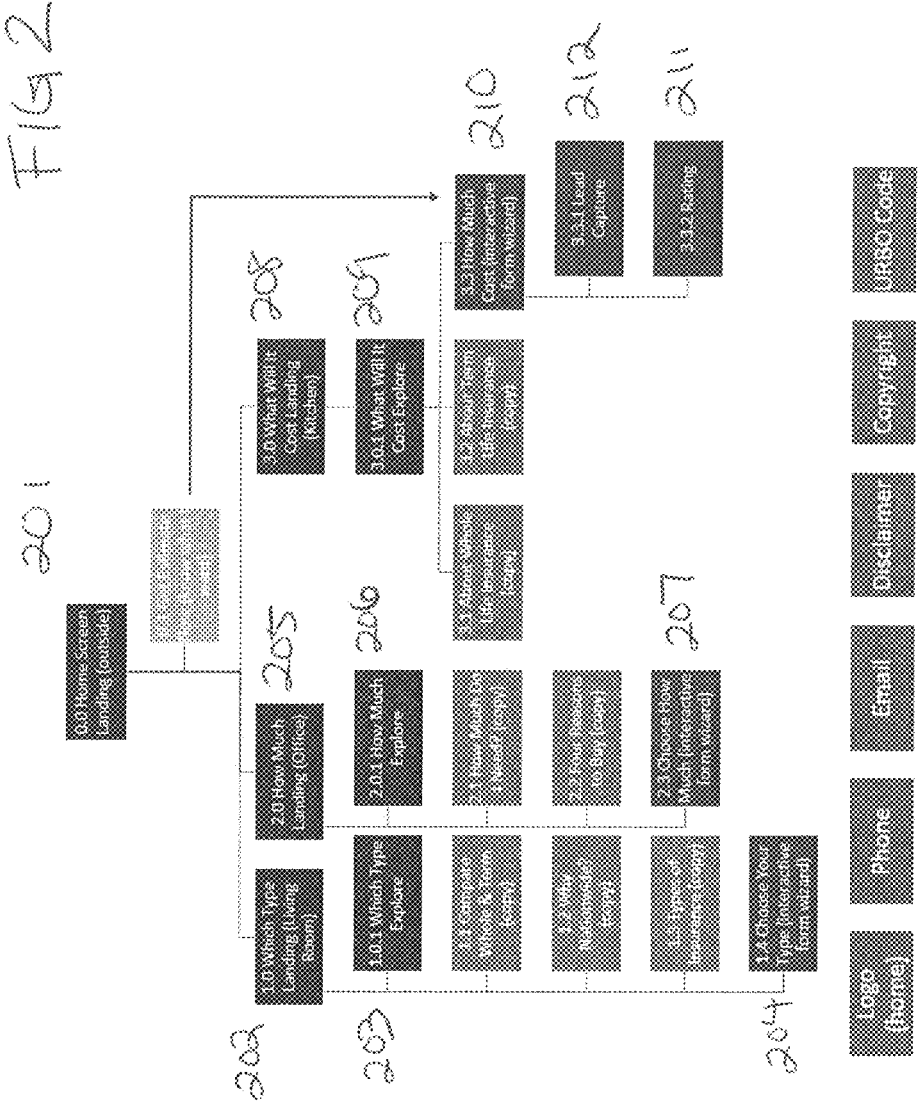

FIG. 3D

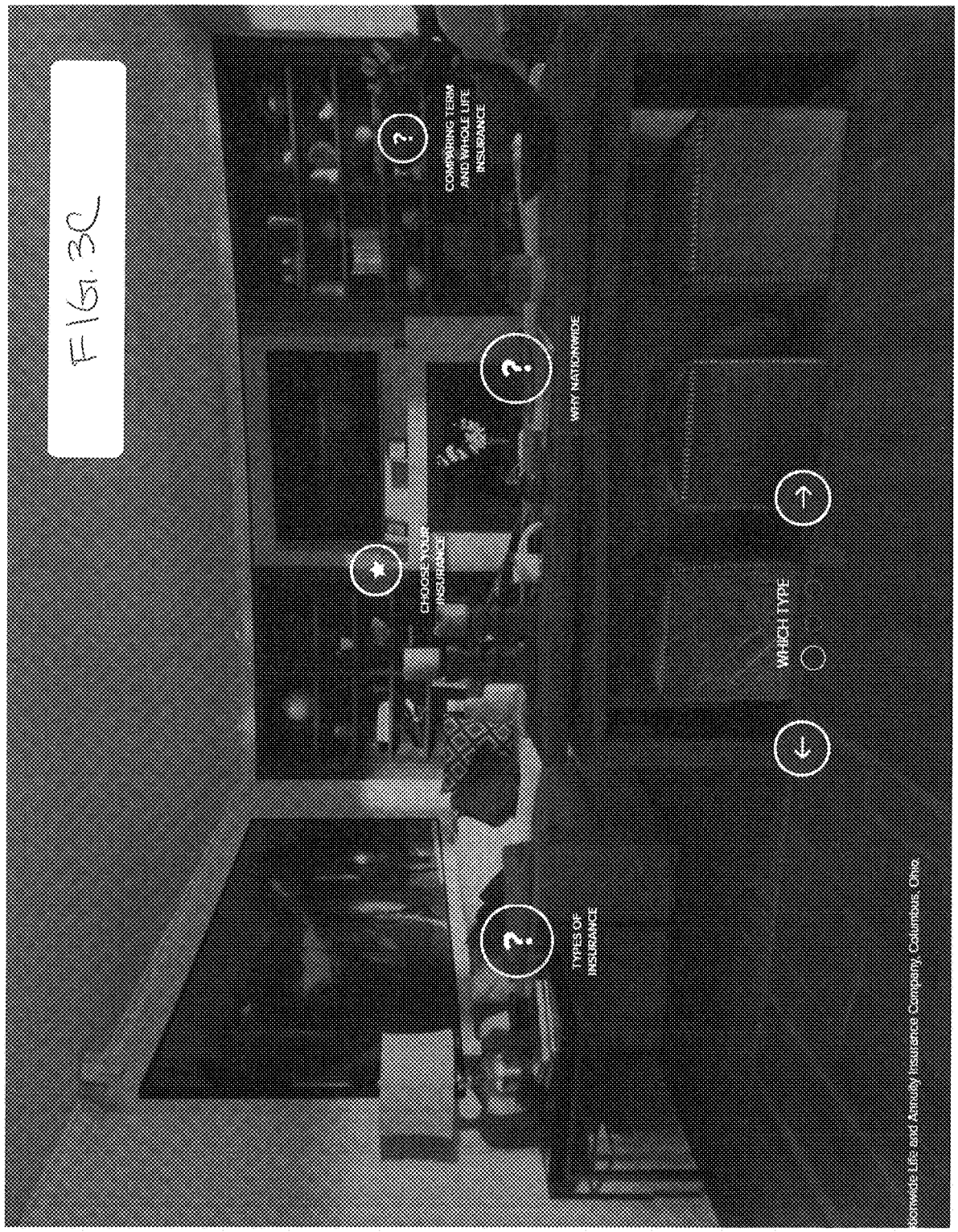

FIG. 35

SYSTEM AND METHOD FOR IMPLEMENTING IMPROVED USER INTERFACE

FIELD OF THE INVENTION

The invention relates to methods for presenting information by way of an interactive interface.

BRIEF SUMMARY OF THE INVENTION

The present invention relates to systems and methods for implementing an improved user interface. A graphical user interface comprising at least two layers is rendered. One layer comprises a still and video image layer. The still and video image layer comprises an interface for displaying a plurality of still images and a plurality of video content items. One layer comprises an interactive icon layer. The interactive icon layer comprises an interface for displaying a plurality of interactive icons. Upon receiving a first navigation request, one the plurality of still images currently being displayed is replaced with another of the plurality of still images. Upon receiving an activation of one of the interactive icons, text and/or graphics or one of a plurality of electronic forms for capturing data input is displayed. Upon the occurrence of a triggering event, one of the plurality of still images currently being displayed ceases to be displayed and is replaced with a display of one of the plurality of video content items in the still and video image layer. The displayed video content item is randomly selected from the plurality of video content items.

In some embodiments, the text and/or graphics comprise information relating to life insurance.

In some embodiments, the electronic form is configured to accept data input to determine a type of life insurance required by a consumer.

In some embodiments, the electronic form is configured to accept data input to determine an amount of life insurance required by a consumer.

In some embodiments, the electronic form is configured to accept data input to determine how much the amount of life insurance required by the consumer will cost.

In some embodiments, data input into the electronic form is received; the data is processed; and the type of life insurance required by the consumer is determined.

In some embodiments, data input into the electronic form is received; the data is processed; and the amount of life insurance required by the consumer is determined.

In some embodiments, data input is into the electronic form is received; the data is processed; and it is determined how much the amount of life insurance required by the consumer will cost.

In some embodiments, the triggering event comprises an elapsed random time interval.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 1 illustrates an exemplary system for carrying out embodiments of the present invention;

FIG. 2A illustrates the levels of exemplary user interfaces made available to the consumer in connection with embodiments of the present invention;

FIGS. 3A through 3J are screen shots illustrating exemplary user interfaces made available to the consumer in connection with embodiments of the present invention.

DETAILED DESCRIPTION OF EMBODIMENTS OF THE INVENTION

Figure 2B:
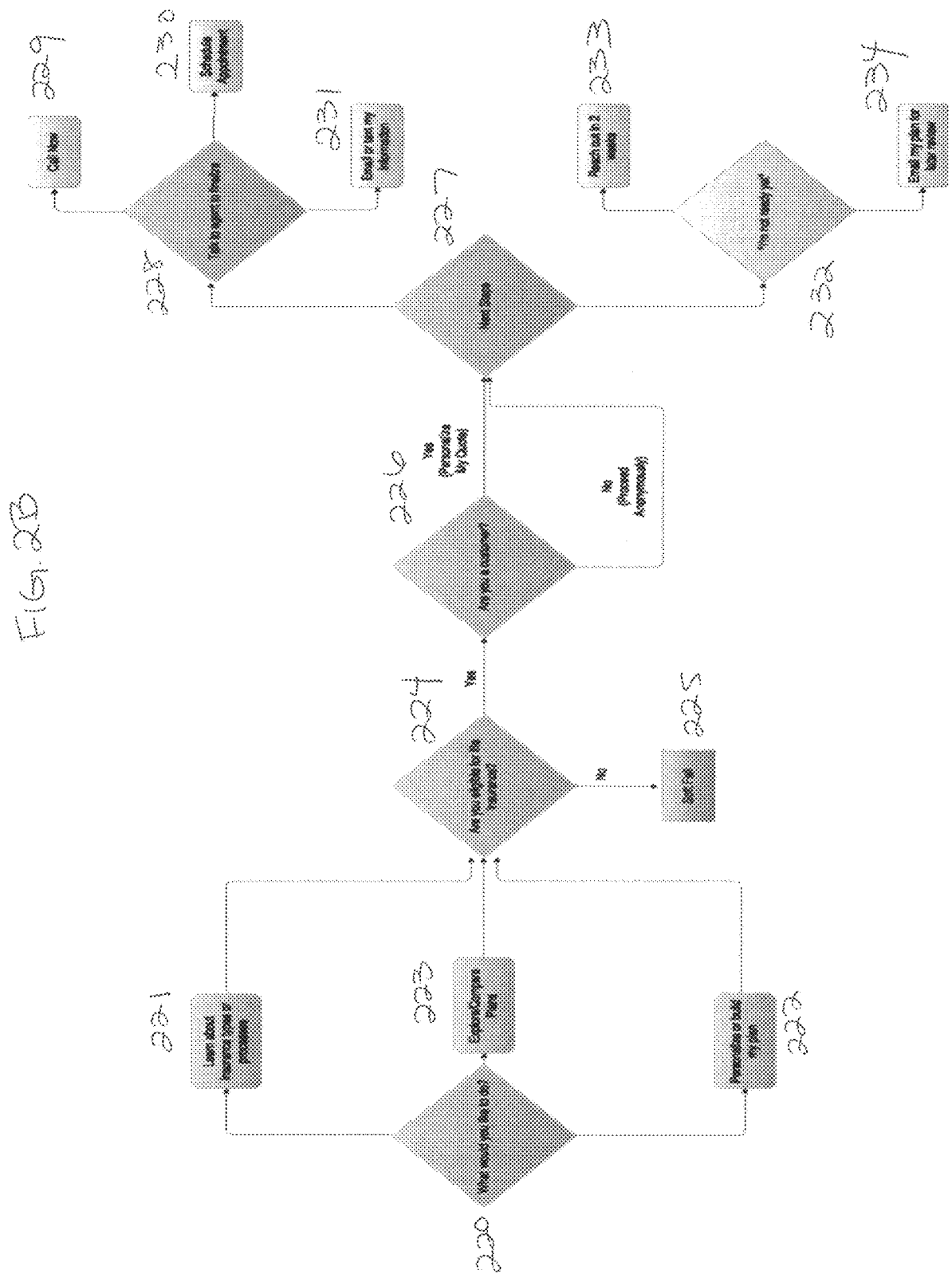
FIG. 2B is a flow chart illustrating an exemplary method of the present invention.

Embodiments of the present invention involve an improved system and associated user interface that may be used to implement an insurance (e.g., life insurance) quote and bind process through a web or mobile-based application. More particularly, embodiments of the present invention comprise an improved web-based application and associated multi-layer user interface, including a still and video image layer and an interactive icon layer, in preferred embodiments. In some embodiments, the video image layer also includes an audio component.

The application offers a unique technical combination of an immersive environment with data entry functionality that is seamless and easy-to-follow for the consumer, as well as data processing capabilities. More particularly, it utilizes a 360 degree design for presenting information about a product, e.g., life insurance, that allows the customer to choose his own path to learn more about the product and that provides information through various digital interactions. Information input by the consumer may be used, in the exemplary insurance context, to generate an immediate quote based on their specific needs. Use of video within the application results in fully immersing the consumers in a realistic experience so that they spend more time embedded in the quote tool, and ultimately receive more quotes, which will lead to more sales. In an exemplary embodiment, 360 degree video footage from a cinema camera shooting at 8K resolution is used. The video may feature characters that closely match the target customer for the product and provides consumers using the application with "slice-of-life" moments, highlighting reasons why the consumer should purchase the product (e.g., for life insurance, to protect those the consumer's family in the event of a death of the consumer).

An exemplary system for implementing embodiments of the invention is shown in FIG. 1. An end user 100 may employ a computing device 110 to access the web-based application over the internet 120. Web server 130 hosts the application. Video content is hosted in content delivery network 140. API Server 150 is used in connection with performing back end processing, interacting with database 160 for retrieving and storing data and other back-end and/or third party systems for data processing.

In an exemplary embodiment, the application is built using HTML (hypertext markup language), CSS (cascading style sheets), and JavaScript. It is architected as an SPA (single page application), meaning that the site itself consists of a single HTML page, but the different screens and interactions are dictated by JavaScript-driven logic. Data transmission between the site, hosted on web server 130, and the database 160 may be made by way of a REST API through API Server 150.

In an exemplary embodiment, two layers of the improved user interface are employed and now described in more detail.

In a first layer, the user interface switches between displaying still images and displaying video images. More particularly, the VR background element utilizes both a still image of the background (e.g., the room) as well as a series of videos. The still image is used to create the 360 view so that videos may be layered on top of the application. This allows for a seamless entry and exit point for the user and makes for a full viewing experience. The still image to video handoff is a critical element. The strategy of using a still image of the background along with the videos is that it allows for random shuffling of the videos as well as providing control over the time between video sequences. This also saves on bandwidth, keeping the video size as small as possible, since the videos are cut to only show the action and not the idle background. Thus, the functionality of the computer system is improved through use of this inventive technique.

The present invention provides for a seamless transition between the videos and the stills. First, the videos and still image of each scene (e.g., the room) are exactly color matched so that any video could play at any time with no apparent jump. Even though the camera taking the video remains completely stationary for each video sequence that is recorded, the constant changing of the sunlight throughout the day during recording results in slight shifts in color of the room. Precise color correction performed is performed in the preferred embodiment to make all the videos match the still image to ensure seamless transitioning.

As mentioned previously, the videos to be displayed are chosen randomly, in an exemplary embodiment. In addition, there may be a randomly-timed delay between the video showings. A video queue service may be used that, upon loading, randomly shuffles all the videos for the current scene. From a display standpoint, the queued video is loaded and able to be shown before swapping the VR asset from still image to video. Once the video has completed playing, the asset is then switched back to the still image, and a random time (e.g., between 5 and 8 seconds) passes before showing the next queued video.

The video overlays the still image and presents moving images (e.g., a person walking across the room), and sound in some embodiments, to the end user by way of the application. Thus, e.g., the video image may use a narrated video approach to help guide a prospect through a quoting application. In so doing, the video may prompt the consumer to input information. e.g., personal information. The interactive icon layer, described elsewhere herein, is used for data input. The video experience is implemented through a combination of gyroscopic and touch-based interactions.

Transitioning between still and video images in accordance with the present invention solves a series of technical problems and provides certain technical advantages. First, switching between still images and video content (as opposed to simply using a single video feed and stopping the video play at points for certain amounts of time to create a still image), solves the technical problem of being able to offer an improved viewing experience for the end user. More particularly, it allows for varying the amount of time between video plays and for shuffling the videos for random play. This results in an improved user interface that looks more organic and natural. In addition, configuration of the system in this manner allows for more flexibility in technical implementation. For example, in some embodiments, the particular video that is selected to be played to the end user may depend on a characteristic associated with the end user (e.g., demographic information) that is learned during interaction of the user with the application, or known upon the user's commencing interaction with the application. If a single video stream was used, such flexibility would not be possible.

Implementation of one exemplary embodiment of the invention is now described. More particularly, a projection of a still image (e.g., of one of the rooms) is made onto a 3D sphere. A JSON file is created that maintains the file path names of the video content that may be displayed with the given still image. The file path name corresponds to the location of the video content in the content delivery network 140. The JSON file also maintains the scripts that allow for shuffling and random selection of the video content, and the random amount of time between the playing of the video. Upon expiration of the random timer, the JSON file script randomly selects the video to be played, loads the video file from content delivery network 140, and informs the 3D sphere projecting the image to project the video. When the video is finished playing, the script informs the 3D sphere to recommence displaying the still image. It then waits a variable/randomly selected amount of time and then loads the next video.

In some embodiments, the application is a touchable one for mobile devices where a user can click and touch elements on his phone to answer the questions and/or navigate the application. This interaction can be seen when a user clicks one of the hot spots on the screen with his finger, as the application will then drive the customer into that section. Also, if the customer were to move his phone to the left or right, the application is able to provide him a continued view of the area to which he is shifting his phone towards. This leads into an ability to have a fully immersive application.

The application may scale based on the device a user is using to access it. For example, on a desktop device it will show more of the background and components then on a mobile device. Also, the layouts for the application will change based on the screen size (for example, the summary screen on a mobile device may be drastically different than the one on the desktop).

In addition, the video-streaming tools leveraged by the framework may include real-time optimization. More particularly, customized data may be rendered either as text within animation or as part of the larger interactive component.

Because the experience does not allow for a 360 degree rotation of the room, the boundaries to the left and right of each room that the user could explore need to be calculated. In order to do this, the camera's field of view (FOV) is taken in to account, as well as the browser size. All of the videos are shot to allow for a total of 180 degrees of exploration. The viewing angle is calculated based on the current browser size and camera FOV. In order to do that, the angles of the left and right frustum planes are calculated. The angles are subtracted from 180 to get the number of degrees of the room that are outside of the camera's viewing angle. The remaining angles to the left and right are then used to stop the camera from rotating beyond those points. All of this is recalculated each time the browser's size changes.

Over the still/video image layer is the interactive icon layer. Using the functionality implemented by this layer, a user may interact with the user interface, e.g., by way of icons, to learn information and/or to input information. In some embodiments, the video may change based on the user information. The information that is input may be used by the system to provide the consumer with, e.g., advice, a quote, and the forms that will be necessary to bind insurance.

In some embodiments, the icons (e.g., referred to herein as 2D hotspots) are tracked over the still/video layer (e.g., also referred to herein as 3D environment). Calculating the position of the 2D hotspots requires the conversion of a 3D point (XYZ) in space to a 2D (XY) coordinate. To start, 3D points are created in space for each of the hotspots. In order to do this, a debugging tool is used that allows for creation of a 3D sphere that can be repositioned in real time with keyboard inputs to change the XY and Z values. Once the position of the sphere in the room is acceptable, that 3D coordinate is recorded as the location for that hotspot. Next, the 2D coordinates for the hotspot icon must be determined. In order to do this, the FOV of the camera and size of the window must be taken into account, as well as the fact that the window size as well as the aspect ratio of the VR canvas are variable. The device pixel ratio for high density mobile devices vs. standard desktop must also be taken into account. A constantly running timer makes these calculations to keep the hotspots tracking over their defined 3D location. The Z depth of each 3D coordinate is also taken into account, so that the 2D hotspot can be scaled slightly to give the illusion of depth.

FIG. 2 is a diagram illustrating exemplary content that may be made available to the consumer. The initial landing page 201 for the application may show a still image of a home in the still image portion of the first layer. From there, the consumer may activate an icon to learn more about what type of life insurance to purchase. This may take the consumer to a second landing page 202, which may have an image of a living room in the still image portion of the first layer. From here, the consumer may explore 203 by comparing whole and term life; learning more about the company selling the life insurance; and/or learning more about types of insurance. Also in this section, an interactive form wizard 204 may be presented to allow the consumer to choose a type of insurance.

Returning back to the initial landing page 201, the consumer may activate an icon 205 to learn more about how much insurance the consumer needs. From here, the consumer may explore 206 information that allows the consumer to learn about how much insurance he may need, and/or reasons why he may buy insurance. Also in this section, an interactive form wizard 207 may be presented to allow the consumer to choose how much insurance to purchase.

Returning again to the initial landing page 201, the consumer may activate an icon 208 to learn more about how much the insurance will cost. From here, the consumer may explore 209 information that allows the consumer to learn about how much whole and term life insurance may cost. Also in this section, an interactive form wizard 210 may be presented to inform the consumer how much his insurance will cost by providing a quote. In connection with generating the quote, the interactive icon layer makes calls to API Server 150. API Server 150 includes or accesses the quoting engine 211 of the insurance company, which generates a monthly premium based on the data input by the consumer. Also, upon the consumer completing the information necessary to generate a quote, the data is pushed to the insurance company's internal lead generation system 212. Still further, API Server 150 may make calls to an external system for generating PDF documents required to bind the insurance, which are then presented to the consumer for download.

FIG. 2B is a flow chart illustrating an exemplary method of the present invention. In step 220, an inquiry is made of the consumer seeking information about how the consumer is interested in proceeding. The consumer may indicate his interest in one of several options: in step 221, learn more about insurances types or processes; in step 222, personalize or build his insurance plan (e.g., if he does not need to be educated on insurance); and in step 223, explore/compare plan options. In step 224, the consumer may be asked a series of questions to determine whether the consumer is eligible for life insurance. If it is determined that he is not, in step 225 the consumer is displayed a message to this effect. If it is determined that he is eligible for life insurance, in step 226, it is determined whether the consumer is already a customer. If not, the process may proceed anonymously. If so, the process may proceed with personalized information for the consumer (e.g., a personalized quote). In step 227, the consumer is queried as to desired next steps. The consumer may respond in step 232 that he is not ready to proceed with insurance, and can request a future follow up (step 233) or request that information be provided for future self-review (step 234). The consumer may respond in step 228 that he wants to talk to an agent before he finalizes his plan. In this case, he may request an immediate call (step 229), to schedule an appointment (step 230), or that information be texted/emailed (step 231).

FIGS. 3A to 3J illustrate exemplary user interfaces that may be used in connection with an embodiment of the present invention. These exemplary user interfaces show the still image portion of the first layer and the icon image layer. Not shown explicitly due to the inability to show motion in a static drawing, but what is shown implicitly through the description herein, is the video portion of the first layer.

Figure 3A:

FIG. 3A shows an exemplary landing page (e.g., element 201 of FIG. 2A). Moving the screen left to right on a mobile device, or moving the mouse on the desktop, reveals additional areas to explore. Clicking the "Get Started" icon takes the user to "Which Type" landing (e.g., element 202 of FIG. 2A). Clicking "Get Your Estimate Now" takes the user to "What Will it Cost" landing (e.g., element 208 of FIG. 2A) and launches "How Much Cost" interactive form wizard (e.g., element 210 of FIG. 2A).

FIG. 3B shows an exemplary "Which Type" landing page. Clicking "Find Your Type" icon launches animation into the room (via the video portion of the first layer). The videos may be placed in a randomized order based on how long a person is sitting and engaging on the page. In a preferred embodiment, there is a delay, e.g., of between 5 and 8 seconds, between initiating the display of each video. Clicking the navigation arrows takes the user back and forth between landing pages (e.g., "Which Type", "How Much", and "What Will it Cost").

FIG. 3C illustrates the page for launching the "Which Type" explore functionality (e.g., element 203 of FIG. 2A). Here, by clicking on the "?" icons, the consumer can compare whole and term life; learn more about the insurance company; and learn more about the types of insurance. By clicking on the star icon, the "Choose Your Type" interactive form wizard is launched (e.g., element 204 of FIG. 2A). As can be seen in this interface and others, navigation arrows are provided along the bottom of the screen, as well as circles (some filled, some not) informing the consumer how far along in the process he has progressed.

Figure 3D:
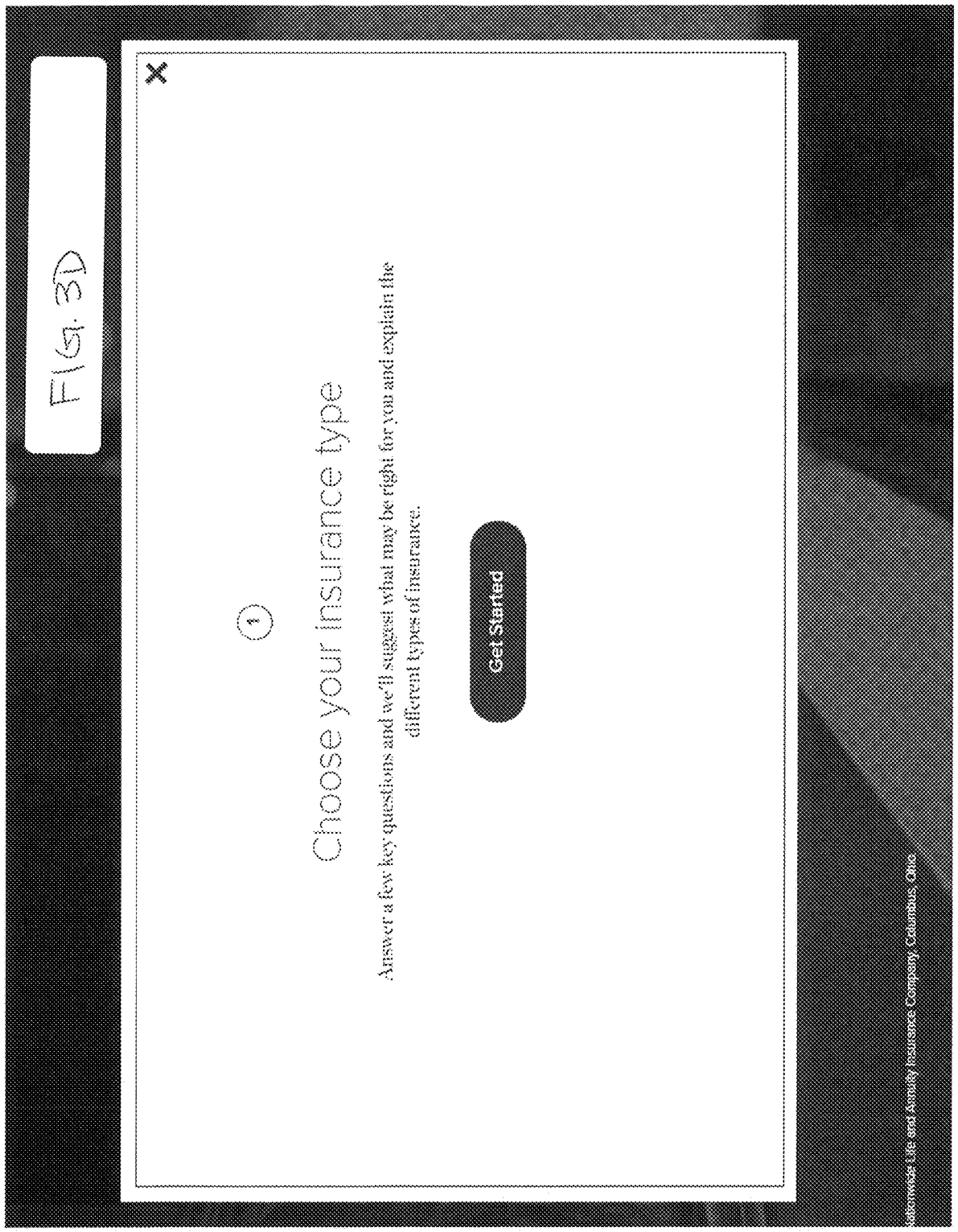

FIG. 3D illustrates the landing screen for the "Choose Your Type" interactive form wizard. In one embodiment, inputting a response automatically advances the screen. Swiping left and right or up and down on a mobile device advances the screen and reveals additional content. The progress bar on the bottom displays the current screen.

Figure 3E:
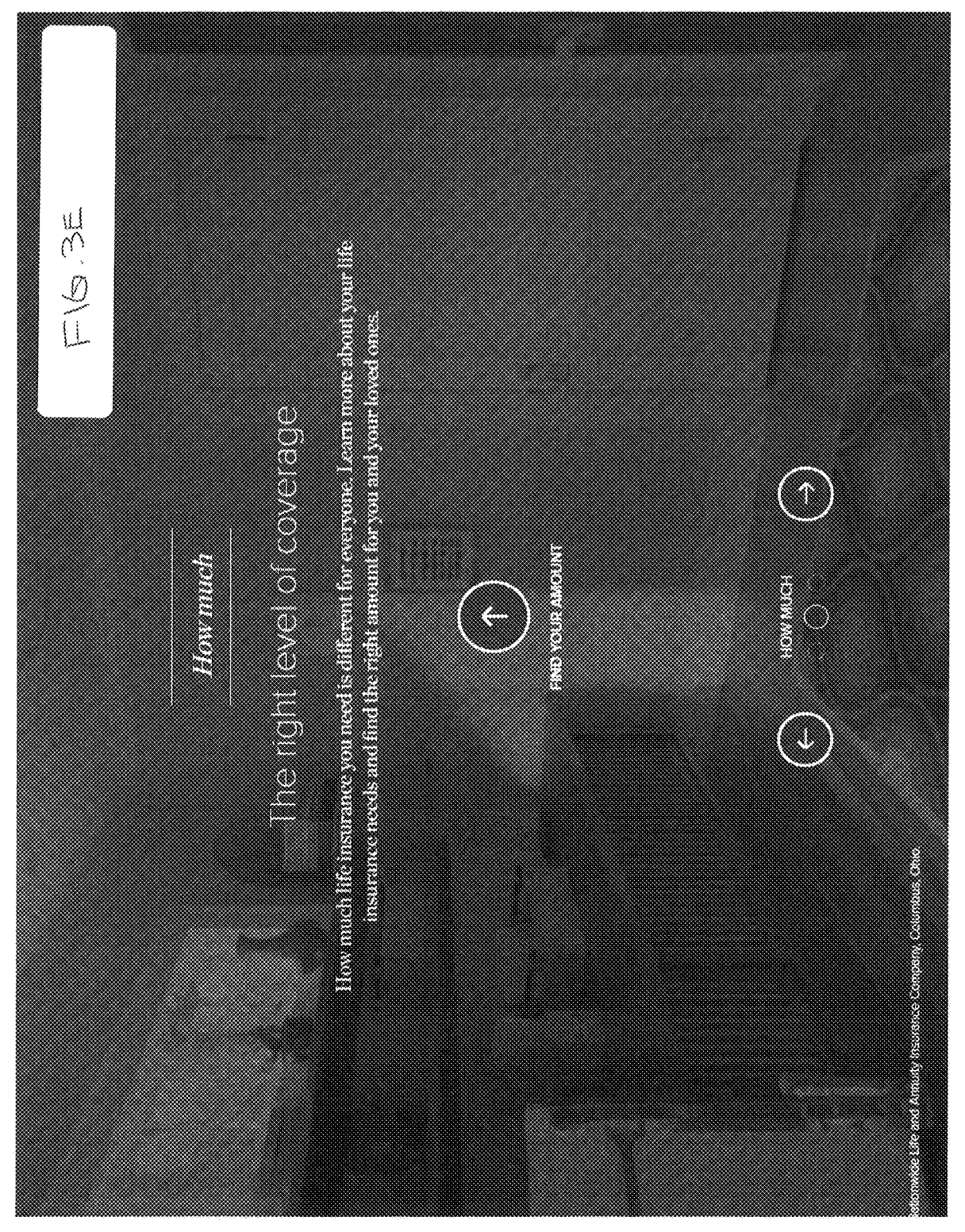

FIG. 3E illustrates the "How Much" landing page (e.g., element 205 of FIG. 2A). Clicking the center arrow icon launches animation into the room (via the video portion of the first layer). Again, this may be randomized based on the time on the page and the amount of videos that were shot. Clicking the navigation arrows takes the user back and forth between landing pages. The room the user is in is filled in as a dot and the name of the room is displayed.

Figure 3F:
Figure 39:
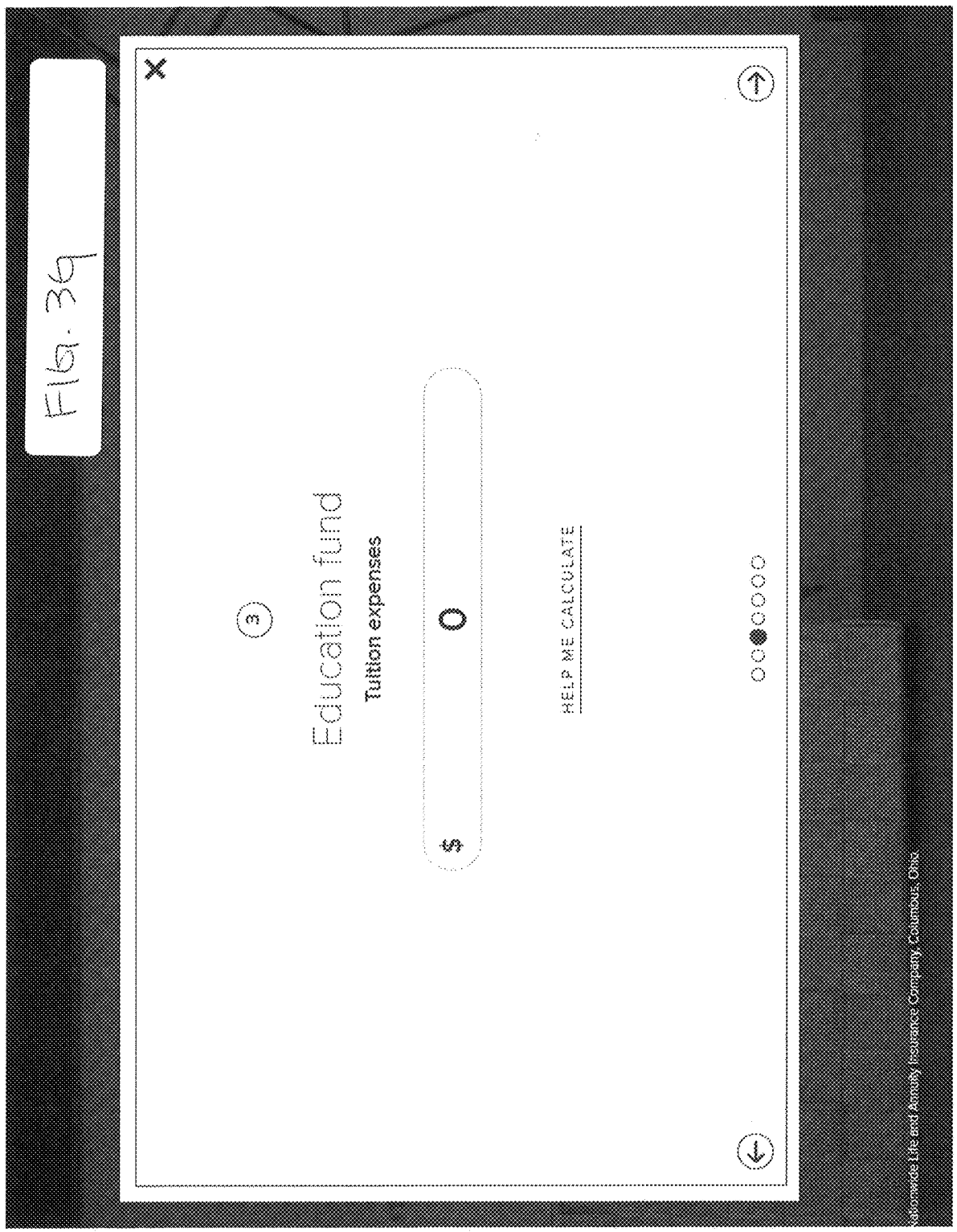

FIG. 3F illustrates the "How Much" explore landing page (e.g., element 206 of FIG. 2A). Clicking on the "?" icons, the consumer can explore "How Much Do I Need" or "Four Reasons to Buy." Clicking on the star icon takes the user to the "Choose How Much" interactive form wizard (e.g., element 210 of FIG. 2A).

FIG. 3G illustrates the "Choose How Much" interactive form wizard. More particularly, when the star icon of FIG. 3F is clicked, a modal window is launched, allowing the user to complete questions. A modal window may also be used to return a suggested amount of coverage based on the inputs.

Figure 3H:
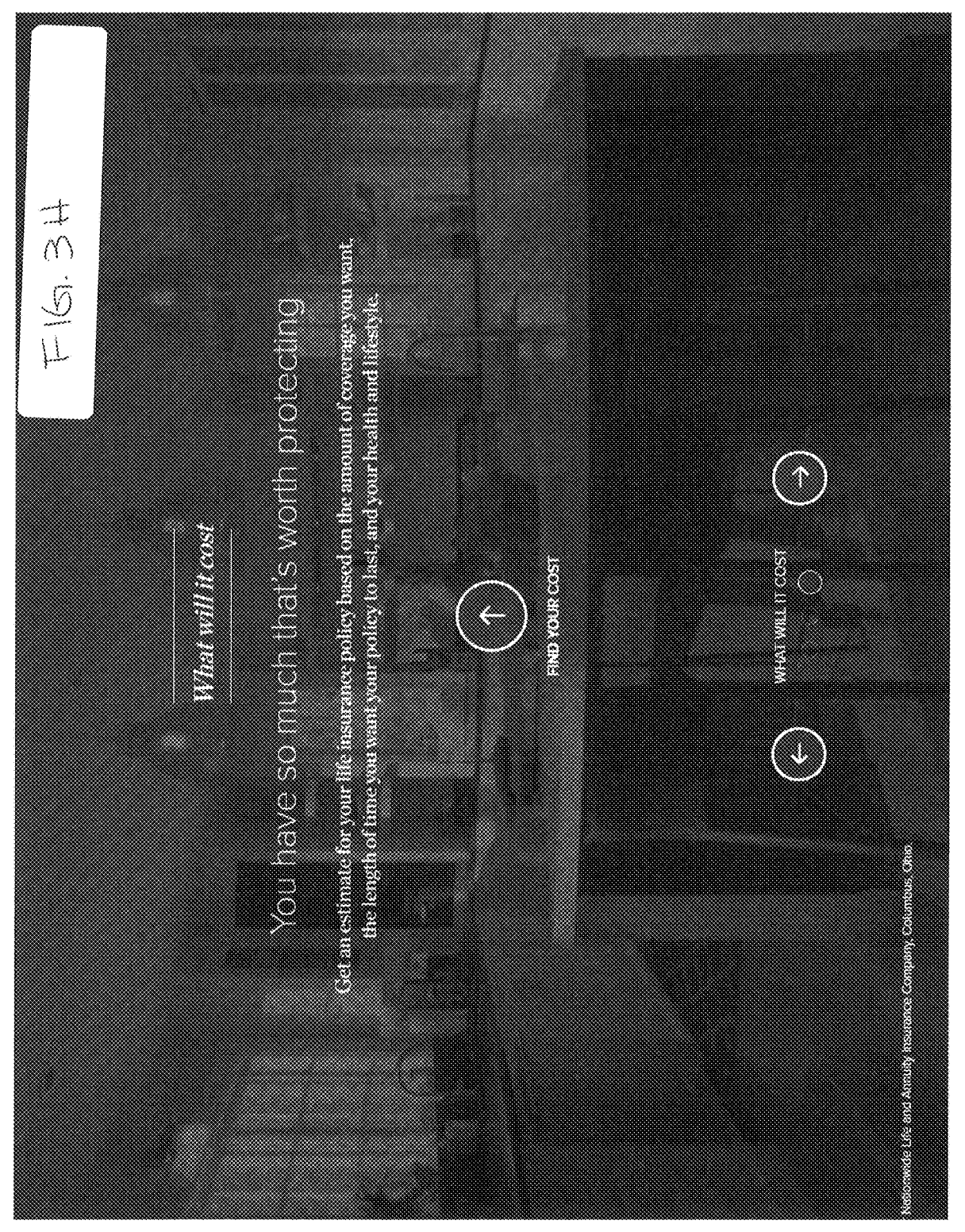

FIG. 3H illustrates the "What Will It Cost" landing (e.g., element 208 of FIG. 2A). Clicking the "Find Your Cost" icon launches animation into the room (via the video layer) and reveals hotspots available to explore.

Figure 3I:
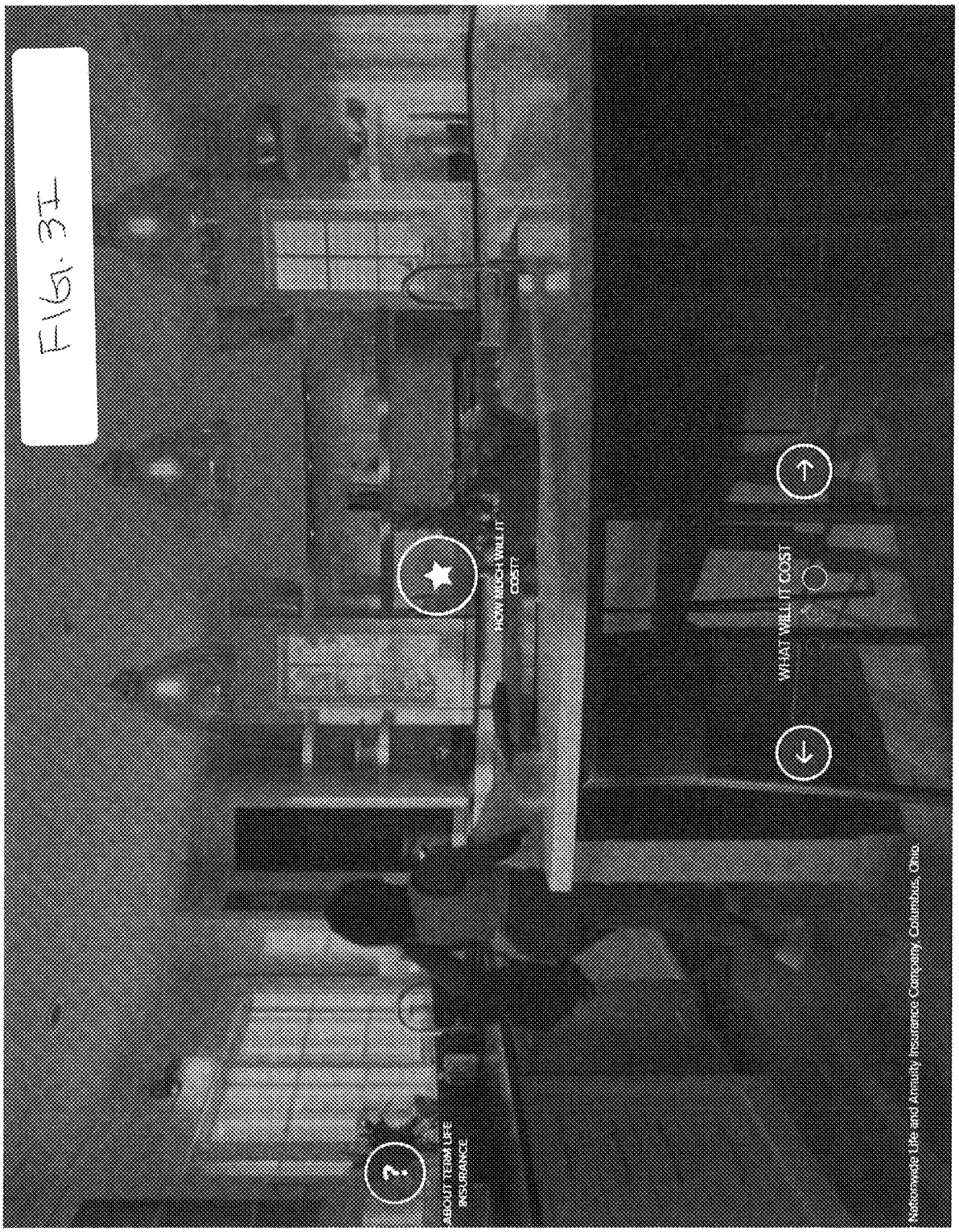

FIG. 3I illustrates the "What Will It Cost" explore page (e.g., element 209 of FIG. 2A. Clicking on "?" icons will present the consumer within information about whole life insurance, and term life insurance. Clicking on the star icon will launch the "What Will it Cost" interactive form wizard (e.g., element 210). This interactive form wizard is described and shown in FIG. 3G. FIG. 3J is an exemplary screen showing the consumer's proposed plan upon completing the interactive form wizard.

Upon completion of the "What Will it Cost" interactive form wizard, a lead capture screen will automatically appear. The inputs from this screen will be pushed to the insurance company's internal lead capture system. Upon completion of data input into the lead capture screen, a rating screen will automatically appear. The user's inputs will be tracked via analytics.

Specific aspects of exemplary graphics that may be used in the interactive icon layer are now described. In one example, an icon is presented that represents a task to be completed (e.g., information to be input). Upon completing the task (i.e., inputting the information), the icon changes (e.g., from a red star to a green check). In other examples, the icon may start as clear or less opaque (e.g., in that the video and/or still images behind the icon can be seen). As the consumer inputs information, or completes a task associated with the icon, the icon becomes more opaque and, finally, may become completely opaque upon completion of the task. Still further, that icon may exhibit a different characteristic upon completion of the task, such as a ripple effect. Also, the icon may attract the user's attention to the user's need to complete certain tasks associated with that icon (e.g., information to be input) by transitioning from less opaque to more opaque where it emits a ripple effect before re-starting in a less opaque state.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method comprising:
   rendering a graphical user interface comprising at least two layers, the at least two layers comprising a still and video image layer, the still and video image layer comprising a plurality of still images and a plurality of videos respectively; and an interactive icon layer, the interactive icon layer comprising a plurality of icons;
   upon receiving a first navigation request during a display of one of the plurality of still images, replacing the one the plurality of still images with another of the plurality of still images;
   upon receiving an activation of one of the interactive icons, displaying one of (1) text and/or graphics and (2) one of a plurality of electronic forms for capturing data input; and
   based upon an occurrence of a triggering event, ceasing to display any of the plurality of still images; and
   playing on the graphical user interface a series of videos in accordance with a video selection sequence comprising a random display order for playing each of the plurality of videos and a randomly selected variable time period between each consecutively displayed video,
   wherein the series of videos includes at least three consecutively arranged videos and the randomly selected variable time period between a first of the three consecutively arranged videos and a second of the three consecutively arranged videos is different from the randomly selected variable time period between the second of the three consecutively arranged videos and a third of the three consecutively arranged videos.

2. The method of claim 1 wherein the text and/or graphics comprises information relating to life insurance.

3. The method of claim 1 wherein one of the plurality of electronic forms is configured to accept data input to determine a type of life insurance required by a consumer.

4. The method of claim 3 further comprising:
   receiving data input into the electronic form;
   processing the data input into the electronic form; and
   determining the type of life insurance required by the consumer.

5. The method of claim 1 wherein one of the plurality of electronic forms is configured to accept data input to determine an amount of life insurance required by a consumer.

6. The method of claim 5 wherein another of the plurality of electronic forms is configured to accept data input to determine how much the amount of life insurance required by the consumer will cost.

7. The method of claim 6 further comprising:
receiving data input into the electronic form;
processing the data input into the electronic form; and
determining how much the amount of life insurance required by the consumer will cost.

8. The method of claim 5 further comprising:
receiving data input into the electronic form;
processing the data input into the electronic form; and
determining the amount of life insurance required by the consumer.

9. The method of claim 1 wherein the triggering event comprises an elapsed randomly selected time interval.

10. The method of claim 1, wherein the still and video image layer includes a still image having at least 180 degrees field of view.

11. The method of claim 1, wherein the still and video image layer includes a video content item having at least 180 degrees field of view.

12. The method of claim 1 further comprising:
projecting one of the plurality of still images or one of the plurality of videos onto a three-dimensional (3D) sphere.

13. The method of claim 1 further comprising:
tracking one of the plurality of interactive icons over the still and video image layer.

14. The method of claim 1 further comprising:
color matching the at least one of the still images with at least one of the plurality of videos.

15. The method of claim 14, wherein the color matching includes color correction.

16. The method of claim 1, wherein a randomly timed delay is present between displaying one of the plurality of videos and displaying another one of the plurality of videos.

17. A system comprising:
memory operable to store at least one program;
at least one processor communicatively coupled to the memory, in which the at least one program, when executed by the at least one processor, causes the at least one processor to perform a method comprising:
displaying a graphical user interface comprising at least two layers, the at least two layers comprising a still and video image layer, the still and video image layer comprising a plurality of still images and a plurality of videos respectively; and an interactive icon layer, the interactive icon layer comprising a plurality of icons;
upon receiving a first navigation request during a display of one of the plurality of still images, replacing the one the plurality of still images with another of the plurality of still images;
upon receiving an activation of one of the interactive icons, displaying one of (1) text and/or graphics and (2) one of a plurality of electronic forms for capturing data input; and
based upon an occurrence of a triggering event, ceasing to display any of the plurality of still images; and
playing on the graphical user interface a series of videos in accordance with a video selection sequence comprising a random display order for displaying playing each of the plurality of videos and a randomly selected variable time period between each consecutively displayed video,
wherein the series of videos includes at least three consecutively arranged videos and the randomly selected variable time period between a first of the three consecutively arranged videos and a second of the three consecutively arranged videos is different from the randomly selected variable time period between the second of the three consecutively arranged videos and a third of the three consecutively arranged videos.

18. A non-transitory computer readable storage medium having stored thereon computer-executable instructions which, when executed by a processor, perform a method comprising:
displaying a graphical user interface comprising at least two layers, the at least two layers comprising a still and video image layer, the still and video image layer comprising a plurality of still images and a plurality of videos respectively; and an interactive icon layer, the interactive icon layer comprising a plurality of icons;
upon receiving a first navigation request during a display of one of the plurality of still images, replacing the one the plurality of still images with another of the plurality of still images;
upon receiving an activation of one of the interactive icons, displaying one of (1) text and/or graphics and (2) one of a plurality of electronic forms for capturing data input; and
based upon an occurrence of a triggering event, ceasing to display any of the plurality of still images; and
playing on the graphical user interface a series of videos in accordance with a video selection sequence comprising a random display order for playing each of the plurality of videos and a randomly selected variable time period between each consecutively displayed video,
wherein the series of videos includes at least three consecutively arranged videos and the randomly selected variable time period between a first of the three consecutively arranged videos and a second of the three consecutively arranged videos is different from the randomly selected variable time period between the second of the three consecutively arranged videos and a third of the three consecutively arranged videos.

* * * * *